United States Patent
Ash (10) Patent No.: US 7,518,713 B2
(45) Date of Patent: Apr. 14, 2009

(54) PASSIVE-OPTICAL LOCATOR

(75) Inventor: William M. Ash, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 298 days.

(21) Appl. No.: 11/482,354

(22) Filed: Jul. 7, 2006

(65) Prior Publication Data

US 2007/0103673 A1  May 10, 2007

Related U.S. Application Data

(63) Continuation-in-part of application No. 11/268,938, filed on Nov. 8, 2005.

(51) Int. Cl.
  *G01C 1/04* (2006.01)
  *G01C 3/08* (2006.01)
(52) U.S. Cl. .................. 356/141.5; 356/4.01; 356/4.03
(58) Field of Classification Search ................ 356/3.13, 356/4.01, 4.03, 141.2, 141.5; 382/103, 106, 382/107
  See application file for complete search history.

(56) References Cited

U.S. PATENT DOCUMENTS

| | | | |
|---|---|---|---|
| 3,836,259 A | 9/1974 | Partridge | |
| 4,949,089 A | 8/1990 | Ruszkowski, Jr. | |
| 5,020,902 A | 6/1991 | Kits van Heyningen | |
| 5,408,541 A | 4/1995 | Sewell | |
| 5,440,112 A | 8/1995 | Sakimura et al. | |
| 5,528,518 A | 6/1996 | Bradshaw et al. | |
| 5,912,642 A | 6/1999 | Coffin et al. | |
| 6,064,942 A | 5/2000 | Johnson et al. | |
| 6,400,311 B1 | 6/2002 | Kolbli et al. | |
| 6,590,521 B1* | 7/2003 | Saka et al. ..................... | 342/70 |
| 6,930,715 B1 | 8/2005 | Mower | |
| 7,098,997 B2 | 8/2006 | Shirai et al. | |
| 7,187,823 B2 | 3/2007 | Dimsdale et al. | |
| 2002/0180636 A1 | 12/2002 | Lin | |
| 2003/0176970 A1 | 9/2003 | Lin | |
| 2004/0174516 A1* | 9/2004 | Tanabata et al. ........... | 356/4.03 |
| 2005/0021282 A1 | 1/2005 | Sammut et al. | |
| 2006/0023204 A1 | 2/2006 | Filep | |
| 2006/0197867 A1 | 9/2006 | Johnson et al. | |

(Continued)

FOREIGN PATENT DOCUMENTS

EP    0820040 A2    1/1998

(Continued)

OTHER PUBLICATIONS

"AN/PAQ-3 Modular Universal Laser Equipment (Mule)", Sep. 12, 1998, p. 2, Publisher: As Military Analysis Network.

(Continued)

*Primary Examiner*—Isam Alsomiri
(74) *Attorney, Agent, or Firm*—Fogg & Powers LLC (57) ABSTRACT

A system comprising an imaging device and a passive-optical range-finder to focus, on the imaging device, a magnified image of a target positioned in a focal plane of the passive-optical range-finder. The system receives information indicative of a target type and generates information indicative of an absolute geographic location for the target based on at least the target type and information output by the imaging device.

18 Claims, 8 Drawing Sheets

U.S. PATENT DOCUMENTS

| | | |
|---|---|---|
| 2006/0265120 A1 | 11/2006 | Coleman et al. |
| 2007/0005306 A1 | 1/2007 | Foessel |
| 2007/0010924 A1 | 1/2007 | Otani et al. |
| 2007/0019066 A1 | 1/2007 | Cutler |
| 2007/0103671 A1 | 5/2007 | Ash |

FOREIGN PATENT DOCUMENTS

| | | |
|---|---|---|
| EP | 1067361 | 10/2001 |
| GB | 2300082 A | 10/1996 |
| GB | 2394376 | 10/2002 |

OTHER PUBLICATIONS

"G/VLLD Laser Target Designator Basis of Issue Plan-BOIP", "http://www.fas.org/man/dod-101/sys/land/docs/bnE008AA.htm.", Nov. 8, 2005, p. 1, Published in: US.

"Lightweight Laser Designator Rangefinder", Jun. 9, 1999, p. 1, Publisher: IEW&S, Published in: US.

Kingslake, "Optical System Design", "Academic Press Inc", 1983, pp. 238-243, Publisher: Academic Press Incharcourt Brace Jovanovich Publishers, Published in: London England.

"Laser Rangefinder/Designators", Feb. 22, 2000, p. 2, Publisher: FAS Military Analysis Network, Published in: US.

Vcelak et al., "AMR Navigation Systems and Methods of Their Calibration, Science Direct, Sensors and Actuators A", May 17, 2005, p. 7, Publisher: Czech Technical University in Prague, Faculty of Electrical Engineering, Department of Measurement, Published in: Czech Republic.

"Charge-Coupled Device", Sep. 29, 2005, p. 5, Publisher: Wikipedia.

* cited by examiner

PASSIVE-OPTICAL LOCATOR

CROSS REFERENCE TO RELATED APPLICATIONS

This application is a continuation-in-part of U.S. patent application Ser. No. 11/268,938, having a title of "PASSIVE-OPTICAL LOCATOR" filed on Nov. 8, 2005. The application is incorporated herein by reference. This application is also related to U.S. patent application Ser. No. 11/482,468, having a title of "PASSIVE-OPTICAL LOCATOR" filed on the same date herewith. The application is incorporated herein by reference.

BACKGROUND

During some military operations, one or more soldiers locate targets to be fired upon by, for example, indirect fire systems or air support and transmit a geographic location for the target to a fire control center or to an integrated tactical network. The fire control center or integrated tactical network then deploys a strike on the target using the target geographic location. Target designators are used by military personnel to determine the geographical coordinates of a target. One type of target designator is designed so that an operator is able to shine a laser at a target and to receive light scattered and/or reflected from the target in order to determine the geographical coordinates of the target.

Such lasers, however, are typically detectable by enemy sensors, which detect the laser light and set off alarms. In some cases, once the enemy realizes the target geographic location is being determined, the target is moved, hidden and/or hardened. Additionally, the enemy can sometimes trace the optical beam back to the operator of the target designator. In this case, the operator can become a target of the enemy.

Moreover, the divergence of the laser beam used in such target designators limits the range of such target designators. If the range is too large, the spot size of the laser becomes too large for range determination. Thus, with some such target designators, the operator must be within 10,000 meters for ranging, and 5000 meters for proper designation of the target, which can place the operator in tactical danger. Timing, coordination and lethality are of the essence for combined arms operations, particularly for non-organic fire support/air operations. It is highly desirable for the combat team to engage targets at the farthest practical range possible.

Furthermore, there are safety issues associated with target designators that use lasers in this way. If the operator or other soldiers near the target designator look directly into the laser, their retina can be burned and/or their vision otherwise impaired.

SUMMARY

A system comprising an imaging device and a passive-optical range-finder to focus, on the imaging device, a magnified image of a target positioned in a focal plane of the passive-optical range-finder. The system receives information indicative of a target type and generates information indicative of an absolute geographic location for the target based on at least the target type and information output by the imaging device.

DRAWINGS

The various described features are not drawn to scale but are drawn to emphasize features relevant to the subject matter described. Reference characters denote like elements throughout the figures and text.

DETAILED DESCRIPTION

In the following detailed description, reference is made to the accompanying drawings that form a part hereof, and in which is shown by way of illustration specific illustrative embodiments in which the claimed invention may be practiced. These embodiments are described in sufficient detail to enable those skilled in the art to practice the claimed invention, and it is to be understood that other embodiments may be utilized and that logical, mechanical, and electrical changes may be made without departing from the scope of the claimed invention. The following detailed description is, therefore, not to be taken in a limiting sense.

Figure 1:
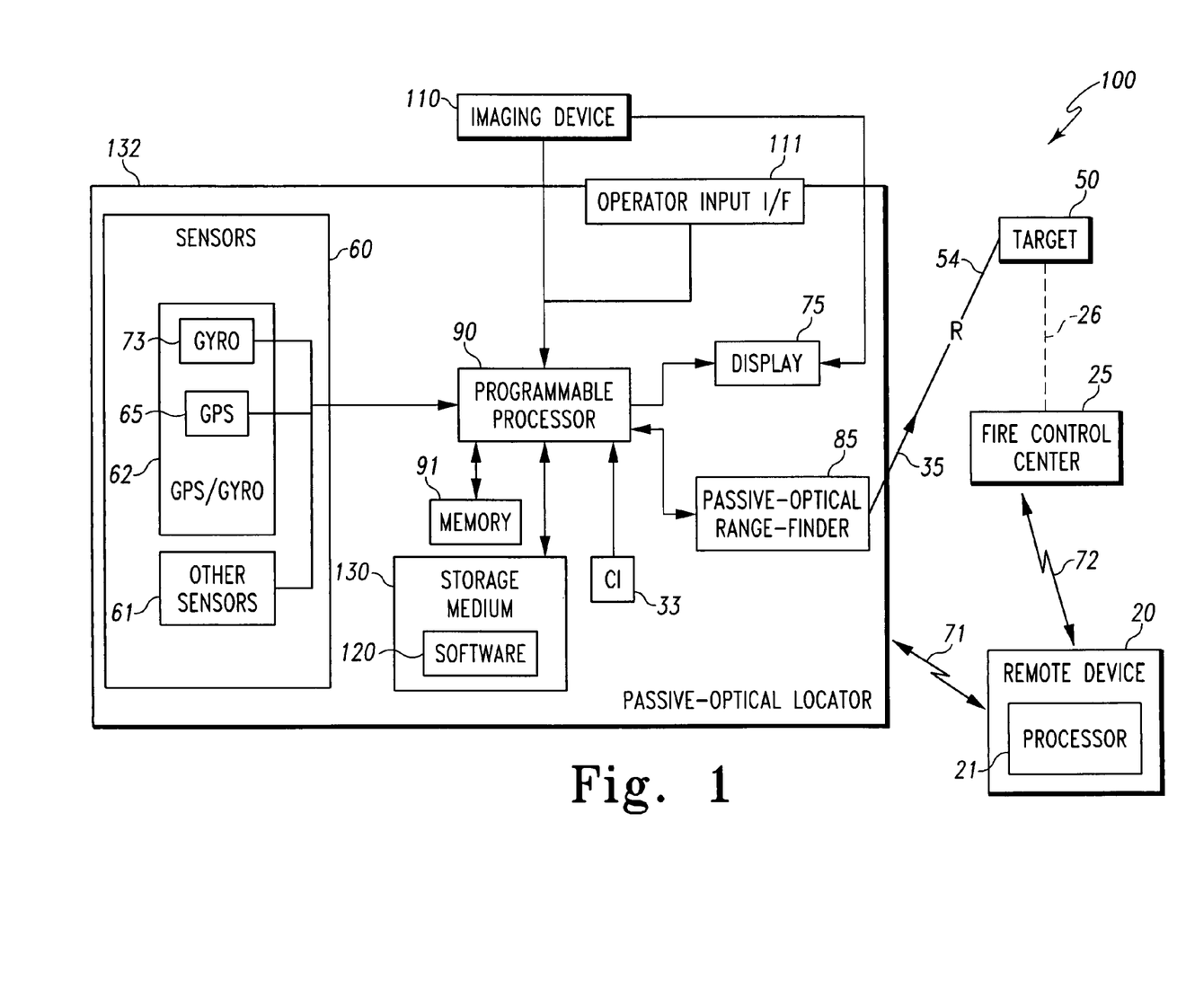
FIG. 1 is a block diagram of an embodiment of a system that uses a passive-optical locator and an imaging device to determine a distance to a target.

FIG. 1 is a block diagram of one embodiment of a system 100 that uses a passive-optical locator 132 and an imaging device 110 to determine a distance R to a target 50. The passive-optical locator 132 includes a passive-optical range-finder 85, sensors 60, a display 75, an operator input interface (I/F) 111, a communication interface (CI) 33, a programmable processor 90, a memory 91 and software 120 stored or otherwise embodied in or on a storage medium 130.

In the embodiment shown in FIG. 1, the passive-optical locator 132 is deployed in a military application in which the passive-optical locator 132 operates in conjunction with the imaging device 110 as a laser-free passive-optical locator to determine the geographic location of a target 50. The passive-optical range-finder 85 focuses a magnified image of the target 50 on the imaging device 110 that is positioned in the image plane (i) (not shown in FIG. 1) also referred to here as the focal plane, of the passive-optical range-finder 85 (as is described in more detail below in connection with FIG. 2). The focal plane of the passive-optical range-finder 85 is the plane that is perpendicular to the optical axis 35 of the passive-optical range-finder 85 and passes through its focus. The target 50 is located in the object plane (o) (not shown in FIG. 1) of the passive-optical range-finder 85. If the object is effectively an infinite distance from the passive-optical range-finder 85, then the focal length is equal to the image distance, which is the distance between the front element surface of the lens system and the image plane. An object is effectively an infinite distance from the passive-optical range-finder 85 when the light rays reflected or emitted from the target 50 are approximately parallel to each other at the passive-optical range-finder 85.

As shown in FIG. 1, the sensors 60 include a global positioning system/gyroscope (GPS/GYRO) device or subsystem 62 and other sensors 61. The GPS/GYRO device 62 comprises one or more gyroscopic devices (GYRO) 73 integrated with a global positioning system (GPS) 65. The other sensors 61 include sensors to sense the relative positions of lenses in an imaging system of the passive-optical range-finder 85. In one embodiment, the other sensors 61 implement position, attitude, and pointing sensor suites that include magnetic compasses, level detectors, accelerometers, pointing feedback loops, odometers, and the like to perform the function of the GPS/GYRO device 62 in directly coupled system configurations, loosely coupled system configurations, or non-coupled system configurations.

The programmable processor 90 executes software 120 and/or firmware that causes the programmable processor 90 to perform at least some of the processing described here as being performed by the passive-optical locator 132. At least a portion of such software 120 and/or firmware executed by the programmable processor 90 and any related data structures are stored in memory 91 during execution. Memory 91 comprises any suitable memory now known or later developed such as, for example, random access memory (RAM), read only memory (ROM), and/or registers within the programmable processor 90. In one implementation, the programmable processor 90 comprises a microprocessor or microcontroller. Moreover, although the programmable processor 90 and memory 91 are shown as separate elements in FIG. 1, in one implementation, the programmable processor 90 and memory 91 are implemented in a single device (for example, a single integrated-circuit device). The software 120 and/or firmware executed by the programmable processor 90 comprises a plurality of program instructions that are stored or otherwise embodied on a storage medium 130 from which at least a portion of such program instructions are read for execution by the programmable processor 90. In one implementation, the programmable processor 90 comprises processor support chips and/or system support chips such as ASICs.

The various components of the passive-optical locator 132 are communicatively coupled to one another as needed using appropriate interfaces (for example, using buses, traces, cables, wires, ports, wireless transceivers and the like). The imaging device 10 is communicatively coupled to the programmable processor 90 in the passive-optical locator 132 using appropriate interfaces (for example, using buses, traces, cables, wires, ports, wireless transceivers and the like).

In one implementation of the passive-optical locator 132, imaging device 110 is an electronic imaging device and comprises a charge-coupled-devices (CCD) or active imaging element sensors (APS). Both APS and CCD technologies input entire frame images to processing electronics so the process is very fast. Available detectors arrays in CCDs and APSs are capable of detecting a broadband spectrum including visible light, the near infrared (NIR), and near ultraviolet. In one implementation of this embodiment, the imaging device 110 comprises a plurality of detector arrays that in combination cover all of the above spectral ranges. CCD detectors include Intensified CCD (ICCD), Electron Multiplying CCD (EMCCD), and other associated technologies, such as light intensification and infra-red imagery. Light intensification and infra-red imagery allow for night vision.

Examples of a commercially available imaging device 110 are the Sony ICX428AKL CCD Image Sensor, the MT9D112 SOC COMS Image Sensor, and the CIDTEC Spectra CAM.

The imaging device 110 is located in the focal plane of the passive-optical range-finder 85 to generate information indicative of the distance R from the passive-optical locator 132 to the target 50 (for example, as described below in connection with FIG. 2). This information is also referred to here as "distance information."

Distance information is generated in part from information indicative of the focal length of the passive-optical range-finder 85 when the image of the target 50, located at the object distance from the passive-optical range-finder 85 is focused on the imaging device 110. This information is also referred to here as "focal length information." As used herein, the passive-optical range-finder 85 is referred to as being "focused" or "in focus" when the passive-optical range-finder 85 is adjusted so as to focus the magnified image of the target 50 on the imaging device 110. The programmable processor 90 executes software 120 to analyze information indicative of the configuration of the passive-optical range-finder 85 in order to determine the focal length information.

The imaging device 110 generates or otherwise outputs image signals associated with the target when the passive-optical range-finder 85 is focused. The distance information is generated in part from information indicative of a target type that is associated with the imaged target 50. This additional information is also referred to here as "target-type information."

The programmable processor 90 executes software 120 to determine target dimensions based on the target-type. In one implementation of this embodiment, pattern matching software executed by the programmable processor 90 generates the target-type information. In another implementation of this embodiment, the programmable processor 90 outputs the image signals to the display 75 for viewing of the target image by a user of the passive-optical locator 132. In this case, an operator of the passive-optical locator 132 views the image of the target 50 displayed on the display 75 and inputs target-type information via the operator input interface 111 based on the viewed image.

Additionally, the imaging device 110 generates or otherwise outputs information indicative of the imaging elements or a subset of the imaging elements on which the target 50 is imaged when the passive-optical range-finder 85 is focused. Such additional information is also referred to here as "imaging-element information." The distance information is generated in part from information indicative of at least one image dimension of the focused magnified image of the target 50. This additional information is also referred to here as "image dimension information."

The programmable processor 90 executes software 120 to generate the image dimension information from the imaging-element information. In one implementation of this embodiment, the programmable processor 90 analyzes the imaging-element information to determine an outline of the image of the target in order to generate the image dimension information.

The distance information is generated in part from information indicative of a magnification of the image of the focused target 50. This additional information is also referred to here as "magnification information." The programmable processor 90 executes software 120 to analyze of information indicative of the configuration of the passive-optical range-finder 85 to determine the magnification information.

The focal length information, the magnification information, the target-type information, the image dimension information comprise the input required for a determination of the distance information.

The one or more gyroscopic devices 73 in the GPS/GYRO device 62 generate information indicative of an azimuth θ and an elevation φ of an optical axis 35 of the passive-optical range-finder 85. Such information is also referred to here as "azimuth and elevation information." In FIG. 1, only one such gyroscopic device 73 is shown though it is to be understood that one or more gyroscopic devices 73 are used in various implementations of such an embodiment. In one implementation of such an embodiment, gyroscopic device 73 comprises an inertial navigation system that generates the azimuth and elevation information. In another implementation of such an embodiment, the gyroscopic device 73 comprises an accelerometer.

The GPS 65 in the GPS/GYRO device 62 generates or otherwise outputs information indicative of an absolute location associated with the passive-optical locator 132. Such information is also referred to here as "GPS information." In one implementation of such an embodiment, the GPS information associated with the passive-optical locator 132 comprises the latitude $Lat_L$, the longitude $Long_L$, and the attitude $Alt_L$ of the passive-optical locator 132. The GPS 65 comprises various GPS implementations such as Differential GPS (DGPS). Although the gyroscopic device 73 and the global positioning system 65 are shown in FIG. 1 as a single, integrated device GPS/Gyro device 62, in other implementations the global positioning system 65 and the gyroscopic device 73 are implemented using two more separate devices. The software 120 and/or firmware executing on the programmable processor 90 processes the GPS information, the distance information, and the azimuth and elevation information in order to determine information indicative of an absolute location associated with the target 50 (also referred to here as the "target location information"). The target location information is defined by a latitude $Lat_T$, a longitude $Long_T$, and an altitude $Alt_T$ of the target 50. The target location information is generated using one or more trigonometric relationships between the distance R between the passive-optical range-finder 85 and the target 50, the azimuth $\theta$, and the elevation $\phi$ of the optical axis 35 of the passive-optical range-finder 85, and the absolute location of the passive-optical locator 132. In one implementation, such trigonometric relationships are established and/or corrected using the calibration techniques described in the '938 Application.

The imaging device 110 outputs image signals associated with the focused magnified target to the programmable processor 90. In one implementation of this embodiment, the programmable processor 90 outputs the image signals to the display 75 for viewing of the target image by an operator of the passive-optical locator 132. In another implementation of this embodiment, the display 75 additionally provides a visual indication of the absolute location of the target 50 for the operator of the passive-optical locator 132. In one implementation of such an embodiment, the display 75 shows the values for the target latitude $Lat_T$, target longitude $Long_T$, and target altitude $Alt_T$. In another implementation, the display 75 shows the values for the distance R, the azimuth $\theta$ and the elevation $\phi$ from the passive-optical locator 132. In other implementations, information indicative of the absolute location of the target 50 is displayed in other ways.

The passive-optical locator 132 comprises a communication interface (CI) 33 that communicates at least a portion of the information indicative of the absolute location of the target 50 from the passive-optical locator 132 to a remote device 20 over a communication link 71. In one implementation of such an embodiment, the target location information is communicated from the passive-optical locator 132 to the remote device 20 by having the operator read such the target location information off the display 75 and describe the target (for example, "Dismounted troops in the open at this grid coordinate"). The operator announces the target location information and the target description into a microphone coupled to the communication interface 33 so that the voice of the operator is communicated over the communication link 71 to the remote device 20. In another implementation, the target location information is communicated in digital form from the programmable processor 90 over the communication link 71. In such an implementation, a processor 21 included in the remote device 20 executes software to process such target location information.

In an alternative embodiment, the target location information is not generated at the passive-optical locator 132 and, instead, focal length information, magnification information, target-type information, image dimension information, azimuth and elevation information, and GPS information is communicated from the passive-optical locator 132 to the remote device 20 and the remote device 20 generates the absolute geographic location associated with the target 50 using such focal length information, magnification information, target-type information, image dimension information, azimuth and elevation information, and GPS information (for example, using software executing on the processor 21 of the remote device 20).

In another embodiment, the distance information is generated at the passive-optical locator 132 from the focal length information, magnification information, target-type information, image dimension information and then the distance information, azimuth and elevation information, and GPS information is communicated from the passive-optical locator 132 to the remote device 20 and the remote device 20 generates the absolute geographic location associated with the target 50 using such distance information, azimuth and elevation information, and GPS information (for example, using software executing on the processor 21 of the remote device 20).

In the embodiment shown in FIG. 1, the remote device 20 is part of an integrated tactical network. The integrated tactical network comprises a wide area network (WAN) used for communications, command, control and intelligence functions for military operations. The integrated tactical network integrates the indirect fire control centers and-forward air controllers to direct fire missions and air strikes. As shown in FIG. 1, the remote device 20 is part of an integrated tactical network. The remote device 20 communicates the target location information for the target 50 to a fire control center 25 over a communication link 72. A target description is also communicated. The fire control center 25 is operable to deploy a weapon (not shown) on a trajectory 26 towards the target 50. In one implementation, the passive-optical locator 132 is packaged in a bipod/shoulder unit that can be carried by a soldier. In another implementation, the passive-optical locator 132 is packaged in a tripod unit that can be carried by a soldier. In yet another implementation, the passive-optical locator 132 is mounted on a vehicle.

The communication links 71 and 72 comprise one or more of a wireless communication link (for example, a radio-frequency (RF) communication link) and/or a wired communication link (for example, an optical fiber or copper wire communication link). For applications of such an embodiment in which secure communication is desired, one or more appropriate protocols for automation, encryption, frequency hopping, and spread-spectrum concealment are used in communicating such information from the remote device 20 to the fire control center 25.

Although a military application is described here in connection with FIG. 1, it is to be understood that the passive-optical locator 132 can be used in other applications, including commercial applications. Generally, the target 50 is an object to be located at an absolute geographic location. In one exemplary usage scenario, the object to be located is a person stranded on a side of a mountain. In this usage scenario, a person in a search and rescue party uses the passive-optical range-finder 85 of the passive-optical locator 132 to focus on an image of the stranded person and the target location information of the stranded person is communicated to a rescue helicopter. Other applications include geographical surveying, civil engineering and navigation.

In one implementation of this embodiment, the passive-optical locator 132 and the imaging device 110 are implemented with a remotely controlled actuator (as described in application Ser. No. 11/482,468) to remotely determine the geographic location of a target 50.

One embodiment in which the programmable processor receives the focal length information, the magnification information, the target-type information, the image dimension information needed to determine the distance information is described with reference to FIG. 2 and FIG. 3. FIG. 2 shows a block diagram of an embodiment of the passive-optical locator 132. As shown in FIG. 2, an exemplary passive-optical range-finder 85 comprises a plurality of lenses represented generally by the numeral 86 that are aligned along a shared optical axis 35 to focus and magnify an object, such as the target 50 (FIG. 1), positioned along the line of sight of the optical axis 35. The relative positions of the lenses 86 shift as the focal length of the passive-optical range-finder 85 is adjusted to focus on the distant target 50 and/or to zoom in or out on the target 50. The programmable processor 90 is communicatively coupled to other sensors 61 that sense the relative positions of the lenses 86 and send the information indicative of the relative positions to the programmable processor 90. The programmable processor 90 executes software 120 to generate the focal length information from the relative positions of the lenses 86.

In one implementation of this embodiment, the programmable processor 90 executes software 120 to generate the magnification information and the focal length information from the relative positions of the lenses 86. For example, the operator can rotate one or more knobs (not shown) on the barrel 133 of the passive-optical locator 132 to modify the focusing and magnifying of the passive-optical range-finder 85. In another implementation of this embodiment, the operator can rotate one or more knobs (not shown) on the barrel 133 of the passive-optical locator 132 to modify the field of view of the passive-optical range-finder 85.

The imaging device 110 is positioned at the focal plane 116, also referred to as the "image plane 116," of the passive-optical range-finder 85. In one implementation of this embodiment, as the relative positions of the lenses 86 shift, the position of the imaging device 110 also shifts relative to the lenses 86.

The operator views an image of the target 50 (FIG. 1) that is displayed on the display 75, through the viewfinder 115. FIG. 3 shows an embodiment of an imaging device 110 on which the magnified image of a target 50 is focused within a subset of the field of view of the plurality of lenses 86. The field of view is generally represented by the numeral 235.

The imaging device 110 comprises an array of imaging elements, for example, pixels, represented generally by the numeral 210. The focused magnified image of the target 50 is incident on a set 230 of the imaging elements 210 internal the field of view 235 in order to generate at least a portion of the information output by the imaging device 110. The set 230 of the imaging elements 210 includes less than all of the imaging elements 210 within the field of view 235 of the passive-optical locator 132. The passive-optical locator 132 in system 10 (shown in FIG. 1) determines at least one of an image height, an image width, and an image depth of the focused magnified image based on the information output by the imaging device 110.

The display 75 is communicatively coupled to imaging device 110 to display the magnified image of the target 50. The user input interface 111 receives the information indicative of the target type. The system correlates the information indicative of the target type to one of the plurality of target types in the lookup table and uses at least one of the height, the width, and the depth associated with the correlated target type. The system determines a distance to the target 50 based on the focal length of the passive-optical range-finder 85 and at least one of a ratio of the height associated with the correlated target type to the image height, a ratio of the width associated with the correlated target type to the image width, and a ratio of the depth associated with the correlated target type to the image depth. The information indicative of the absolute geographic location for the target is generated, at least in part, based on the distance.

The height of each imaging element is measured along the X-direction and is represented generally by the letter "H." The width of each imaging element is measured along the Y-direction and is represented generally by the letter "W." The imaging elements are positioned in a rectangular array of rows and columns. Rows extend in the X-direction and columns extend in the Y-direction. The exemplary imaging device 110 of FIG. 3 includes six rows and seven columns to form a 6×7 rectangular matrix. The right-most edges of imaging elements 210 in a shared row have a spacing represented as "$S_C$" that is slightly larger than "W." Likewise, the bottom-most edges of imaging elements 210 in a shared column have a spacing represented as "$S_R$" that is slightly larger than "H."

A processing unit 190 in the imaging device 110 is communicatively coupled to each of the imaging elements. The processing unit 190 sends the image signals from the imaging device 110 to the programmable processor 90. In one implementation of this embodiment, the image signals are sent directly from the imaging elements 210 to the programmable processor 90 in the passive-optical locator 132.

In this exemplary case, the target 50 is a heavy armor tank (also referred to here as a "tank"). The magnified image of the tank is focused on a set of the imaging elements that are a subset 230 of all the imaging elements 210 within the field of view 235 of the passive-optical locator 132. As shown in FIG. 3, the target image is formed on six adjacent imaging elements 210 that form a 2×3 rectangular matrix referred to here as subset 230. The image height, which is the height of the image of the tank, is represented generally by the numeral 220 and has a linear dimension of about $2S_R$. The linear dimension $2S_R$ is a first portion of the imaging-element information. The image of the tank is seen from the side in FIG. 3. The image length, which is the length of the image of the tank, is represented generally by the numeral 225 and has a linear dimension of about $3S_C$. The linear dimension $3S_C$ is a second portion of the imaging-element information. In one implementation of this embodiment, the subset 230 of imaging elements 210 is outlined by input received from the operator of the passive-optical locator 132 via the operator input interface 111.

The processing unit 190 sends both portions of the imaging-element information to the programmable processor 90. The programmable processor 90 calculates values (in dimensions of length) for the imaging-element information $2S_R$ and $3S_C$ using the dimensions $S_C$ and $S_R$ stored in the memory 91. The calculated values are the image dimension information or information indicative of the image height and the image depth. In one implementation of this embodiment, the processing unit 190 calculates values (in dimensions of length) for the imaging-element information $2S_R$ and $3S_C$ and sends the image dimension information to the programmable processor 90.

If the image of the tank is seen from the front or back, the image width is visible. In that case, the image width replaces the image depth as the second portion of the imaging-element information. In that case, the processing unit 190 sends the information indicative of the image height and the image width to the programmable processor 90 as the image dimension information.

The programmable processor 90 receives the target-type information from the operator of the passive-optical locator 132. The operator views the target image, such as the tank image shown in FIG. 2, as it is displayed on the display 75. In one implementation of this embodiment, the operator inputs target-type information code via the operator input interface 111 to the programmable processor 90.

In another implementation of this embodiment, the operator views the target image and then selects the associated target-type information from a lookup table stored in the memory 91, such as the TABLE 1 shown below. The programmable processor 90 retrieves a target-type table, such as TABLE 1 which shows dimensions for exemplary target types, from the memory 91 to obtain the target dimensions for the target. The lookup table comprises information indicative of at least one of a height, a width, and a depth of a respective one of the plurality of target types. In this case, after the operator selects the target-type information, the target-type information is sent to the programmable processor 90.

Figure 3:
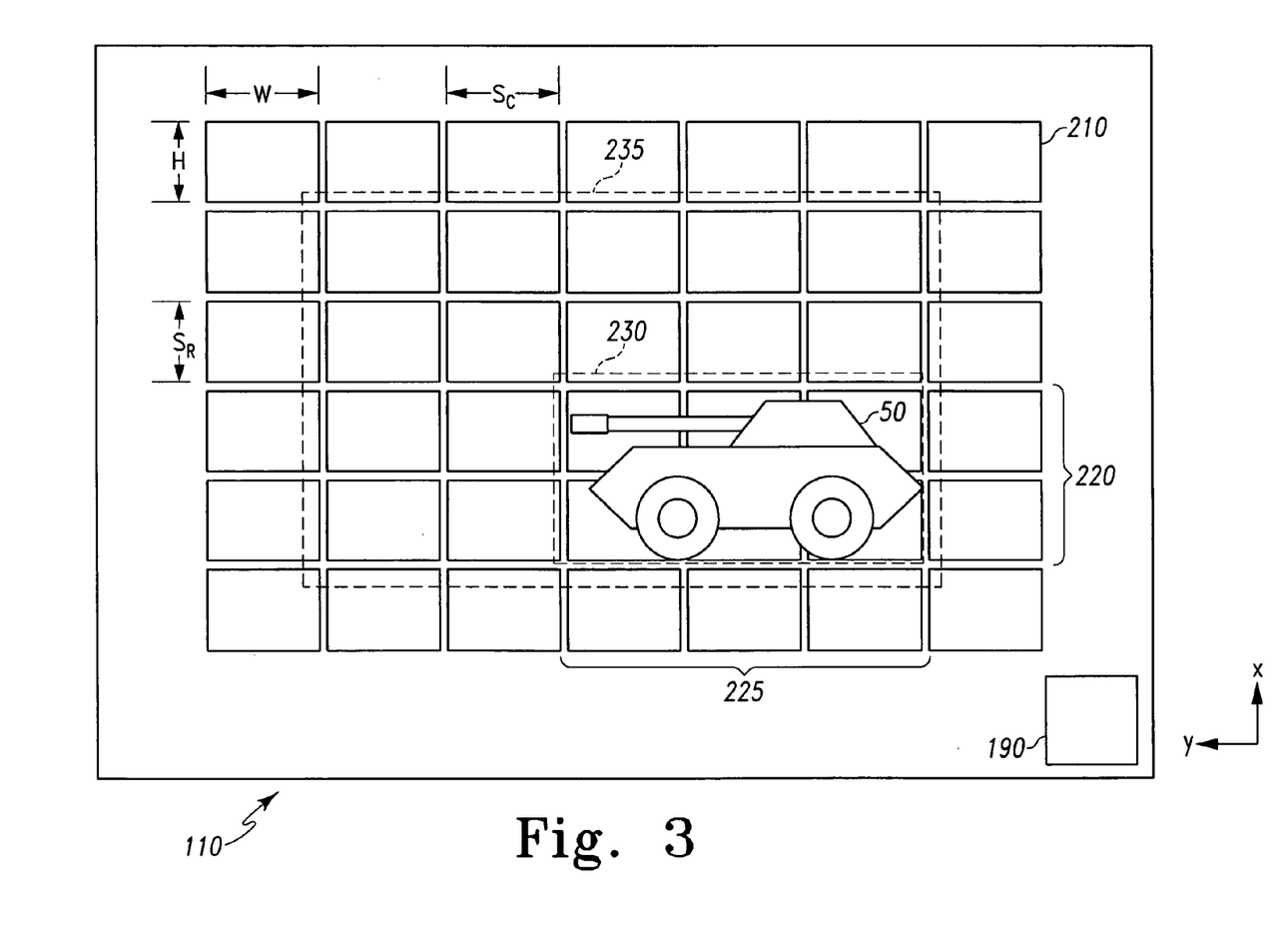
FIG. 3 shows an embodiment of an imaging device on which a magnified image of a target is focused within a subset of field of view of a passive-optical locator.

For the exemplary heavy armor tank viewed in FIG. 3, the programmable processor 90 received the target type of "HEAVY ARMOR TANK" from the operator.

TABLE 1

Exemplary target-type table.

| Exemplary Target type | Height | Width | Depth |
|---|---|---|---|
| Armored Personnel Carrier | 2.3 m | 2.8 m | 5.8 m |
| Building: Single story | 6 m | 8 m | 9 m |
| Building: Two story | 12 m | 12 m | 12 m |
| Heavy Armor Tank | 4 m | 4 m | 7 m |
| Truck (2.5 Ton) | 5 m | 4 m | 9 m |
| Personnel | 2 m | 0.2 m | 0.5 m |

In one implementation of this embodiment, the operator inputs information indicative of the view of the target 50 via the operator input interface 110. In the exemplary case of FIG. 3, the operator inputs "SIDE VIEW" and the programmable processor recognizes that the depth dimension is required for the tank (for example, 7 meters) from TABLE 1. In another implementation of this embodiment, the operator inputs view and a viewing angle. In this case, the programmable processor 90 takes the cosine of the viewing angle to translate the view image dimension of width or depth to a front view or side view, respectively. In yet another implementation of this embodiment, the programmable processor uses the elevation information to provide the required cosine factor to the imaged height, if the target 50 is at an elevation that differs from the elevation of the passive-optical locator 132. The programmable processor 90 retrieves the dimensions for the tank height, tank width, and tank depth of the heavy armor tank from TABLE 1 based one the viewing angle of the target 50.

Since the magnification of a lens system is the ratio of the target image/target, the programmable processor 90 calculates the ratio of the tank image height/tank height, and the ratio of the tank image depth/tank depth to calculate the magnification of the passive-optical range-finder 85. The magnification is also the ratio of the focal length of the imaging system of passive-optical range-finder 85 to the distance R to the target 50 (shown in FIG. 1). The programmable processor 90 generates the value of the distance R to the target 50 by calculating R=focal length/magnification. The passive-optical locator 132 then determines the absolute location associated with the target 50 as described in the '938 Application.

In one implementation of this embodiment, the programmable processor 90 executes software 120 to generate both magnification information and focal length information from the relative positions of the lenses 86. In this implementation, the programmable processor 90 does not use the target-type information but determines the distance information from the equation $M=i/o$, where M is the magnification, o is the object distance that equals the focal length, and i is the image distance that equals the distance R to the target 50. In one implementation of this embodiment, the generated magnification information provides a confirmation to the ratios of the calculated image height/tank height and the image depth/tank depth.

Figure 2:
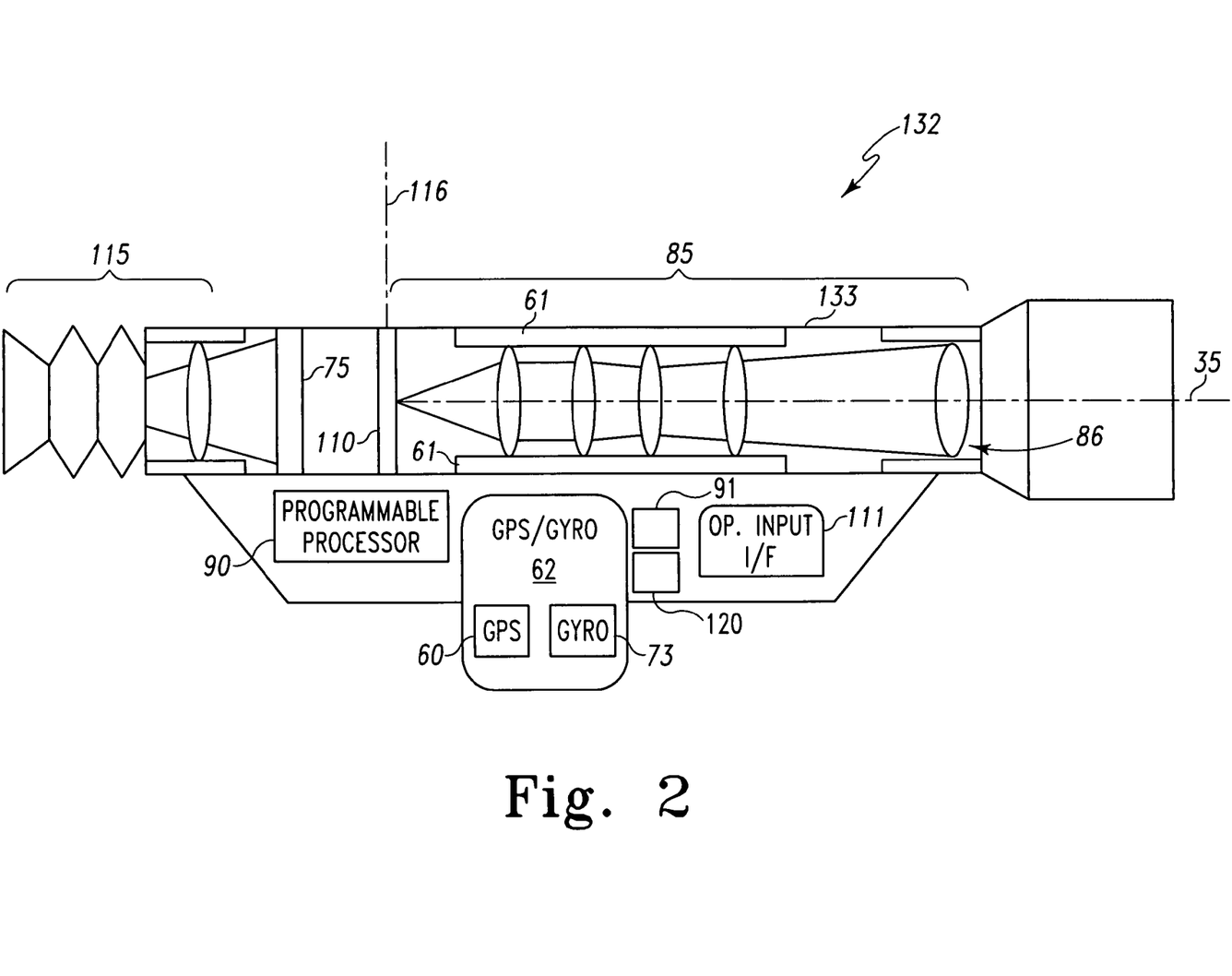
FIG. 2 shows a block diagram of an embodiment of a passive-optical locator.

The passive-optical locator 132 as shown in FIG. 2 can be carried by the operator to a remote location and set up on a tripod when the operator uses the passive-optical locator 132. In another implementation of this embodiment, the passive-optical locator 132 shown in FIG. 2 is carried in a land vehicle to a remote location. Thus, system 10 includes an imaging device 110 and a passive-optical range-finder 85 to focus, on the imaging device 110, a magnified image of a target 50 that is positioned in an object plane of the passive-optical range-finder. The system 10 receives information indicative of a target type and generates information indicative of an absolute geographic location for the target 50 based on at least the target type and information output by the imaging device 110.

Additionally, at least one sensor 60 generates information indicative of an azimuth and an elevation of an optical axis 35 of the passive optical range-finder 85, and the information indicative of the azimuth and the elevation are additionally used to generate the information indicative of the absolute geographic location for the target 50. The information indicative of the absolute geographic location for the target is generated, at least in part, based on at least one of: information indicative of a magnification of the magnified image, information indicative of a focal length of the passive-optical range-finder, and information indicative of a geographic location associated with the passive-optical locator. In one implementation of this embodiment, the information indicative of the absolute geographic location for the target is generated, at least in part, using at least some of the information included in the lookup table. In another implementation of this embodiment, pattern-recognition software 120 determines the target type for the target 50.

Figure 4:
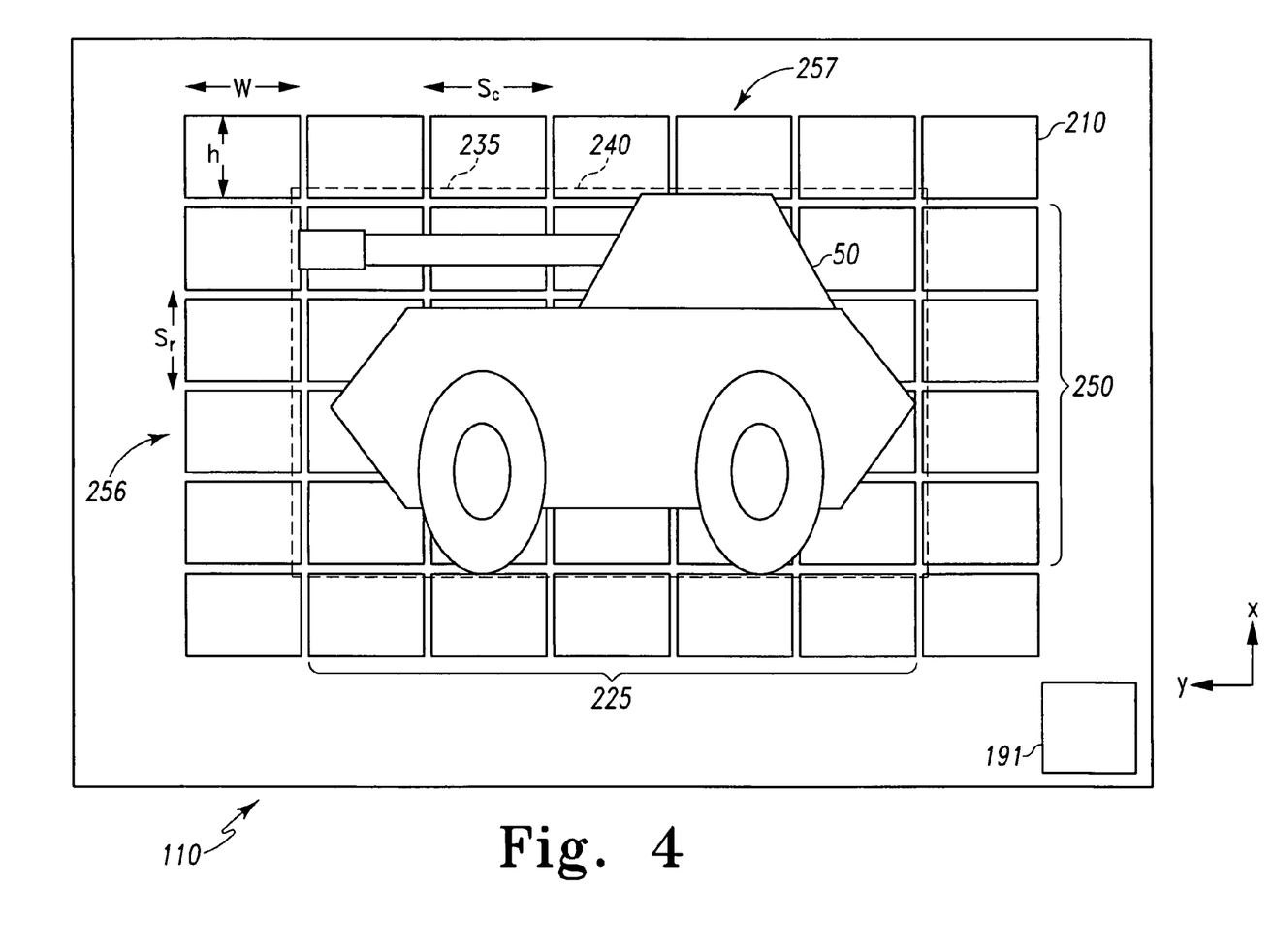
FIG. 4 shows an embodiment of an imaging device on which a magnified image of a target is focused within a complete field of view of a passive-optical locator.

FIG. 4 shows an embodiment of an imaging device on which the magnified image of a target 50 is focused within the complete field of view 235 of the passive-optical locator 132. As shown in FIG. 4, the target image is formed on twenty adjacent imaging elements 210 that form a 4×5 rectangular matrix referred to as "subset 240," and also referred to as the "set of the imaging elements 240." The image height, which is the height of the image of the tank, is represented generally by the numeral 250 and has a linear dimension of about $4S_R$. The linear dimension $4S_R$ is a first portion of the imaging-element information. The image of the tank is seen from the side in FIG. 4. The image length, which is the length of the image of the tank, is represented generally by the numeral 255 and has a linear dimension of about $5S_C$. The linear dimension $5S_C$ is a second portion of the imaging-element information.

The set of the imaging elements 240 includes all of the imaging elements 210 within a field of view 235 of the passive-optical locator 132. The imaging elements 210 have the shape and spacing along the two dimensions X and Y as described above with reference to FIG. 3. The set of the imaging elements 240 on which the focused magnified image of the target 50 is incident defines a target outline. The focused magnified image of the target is incident on all the imaging elements in at least one row 256 of the target outline and all the imaging elements 210 in at least one column 257 of the target outline. The row 256 provides information indicative of the image depth, shown as the length of the tank, and the column 257 provides information indicative of the image height. If the tank were imaged from the front or back, then row 256 provides information indicative of the image width.

Figure 5:
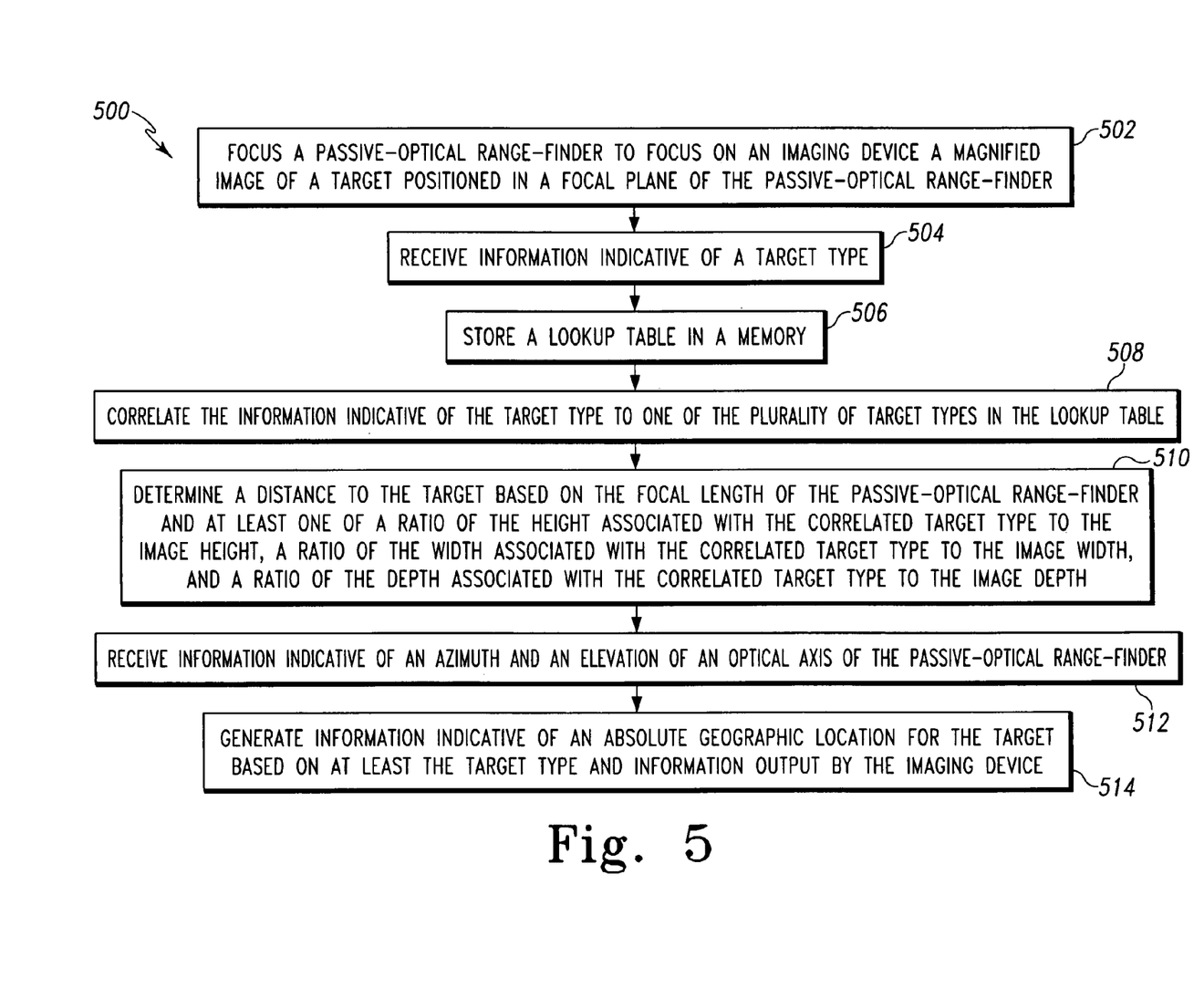
FIG. 5 is a flowchart of one embodiment of a method of generating information indicative of an absolute geographic location for a target.

FIG. 5 is a flowchart of one embodiment of a method 500 of generating information indicative of an absolute geographic location for a target. The embodiment of method 500 can be implemented using the passive-optical locator 132 of FIG. 1. In such an embodiment, at least a portion of the processing of method 500 is performed by software 120 executing on the programmable processor 90 of the passive-optical locator 132. Other embodiments are implemented in other ways.

At block 502, a passive-optical range-finder is focused to form a magnified image of a target on an imaging device positioned in a focal plane of the passive-optical range-finder (for example, as described above in connection with FIGS. 1 and 2). At block 504, information indicative of a target type is received at the passive-optical locator that comprises the passive-optical range-finder (for example, by having a user input such information and/or via the execution of pattern-recognition software). At block 506, a lookup table is stored in a memory. The lookup table comprises information about a plurality of target types. In one implementation, the lookup table is created "offline" and stored in a memory (or on or in a storage medium) included in the passive optical locator. The information indicative of the absolute geographic location for the target is generated, at least in part, using at some of the information included in the lookup table. In one implementation, the lookup table comprises information indicative of at least one of a height, a width, and a depth of a respective one of the plurality of target types and the information indicative of the absolute geographic location for the target is generated, at least in part, in the manner described above in connection with TABLE 1 and FIG. 3.

The imaging device comprises an array of imaging elements. The focused magnified image of the target is incident on a set of the imaging elements in order to generate at least a portion of the information output by the imaging device. At least one of an image height, an image width, and an image depth of the focused magnified image is determined based on the information output by the imaging device. In one implementation of this embodiment, the set of the imaging elements includes all of the imaging elements within a field of view of the passive-optical locator (for example, as shown in FIG. 4). In another implementation of this embodiment, the set of the imaging elements is less than all of the imaging elements within the field of view of the passive-optical locator (for example, as shown in FIG. 3). At block 508, the information indicative of the target type is correlated to one of the plurality of target types in the lookup table (for example, as described above in connection with TABLE 1).

At block 510, a distance to the target is determined based on the focal length of the passive-optical range-finder and at least one of a ratio of the height associated with the correlated target type to the image height, a ratio of the width associated with the correlated target type to the image width, and a ratio of the depth associated with the correlated target type to the image depth (for example, as described above in connection with FIG. 2 and TABLE 1). The information indicative of the absolute geographic location for the target is generated, at least in part, based on the distance.

At block 512, information indicative of an azimuth and an elevation of an optical axis of the passive optical range-finder is received at the passive-optical locator. The information indicative of the azimuth and the elevation are used to generate the information indicative of the absolute geographic location for the target as described in the '938 Application.

At block 514, information indicative of an absolute geographic location for the target is generated based on at least the target type and information output by the imaging device. The information indicative of the absolute geographic location for the target is generated, at least in part, based on at least one of: information indicative of a magnification of the magnified image, information indicative of a focal length of the passive-optical range-finder, and information indicative of a geographic location associated with the passive-optical locator. The information indicative of the absolute geographic location is generated as described above with reference to the '938 application using the information indicative of a magnification of the magnified image and/or the information indicative of a focal length of the passive-optical range-finder in conjunction with the information indicative of a geographic location associated with the passive-optical locator. The information indicative of a magnification of the magnified image and/or the information indicative of a focal length of the passive-optical range-finder are obtained as described above with reference to FIG. 2 and the information indicative of a geographic location associated with the passive-optical locator is obtained from the GPS 65 shown in the sensors 60 of FIG. 1.

Figure 6:
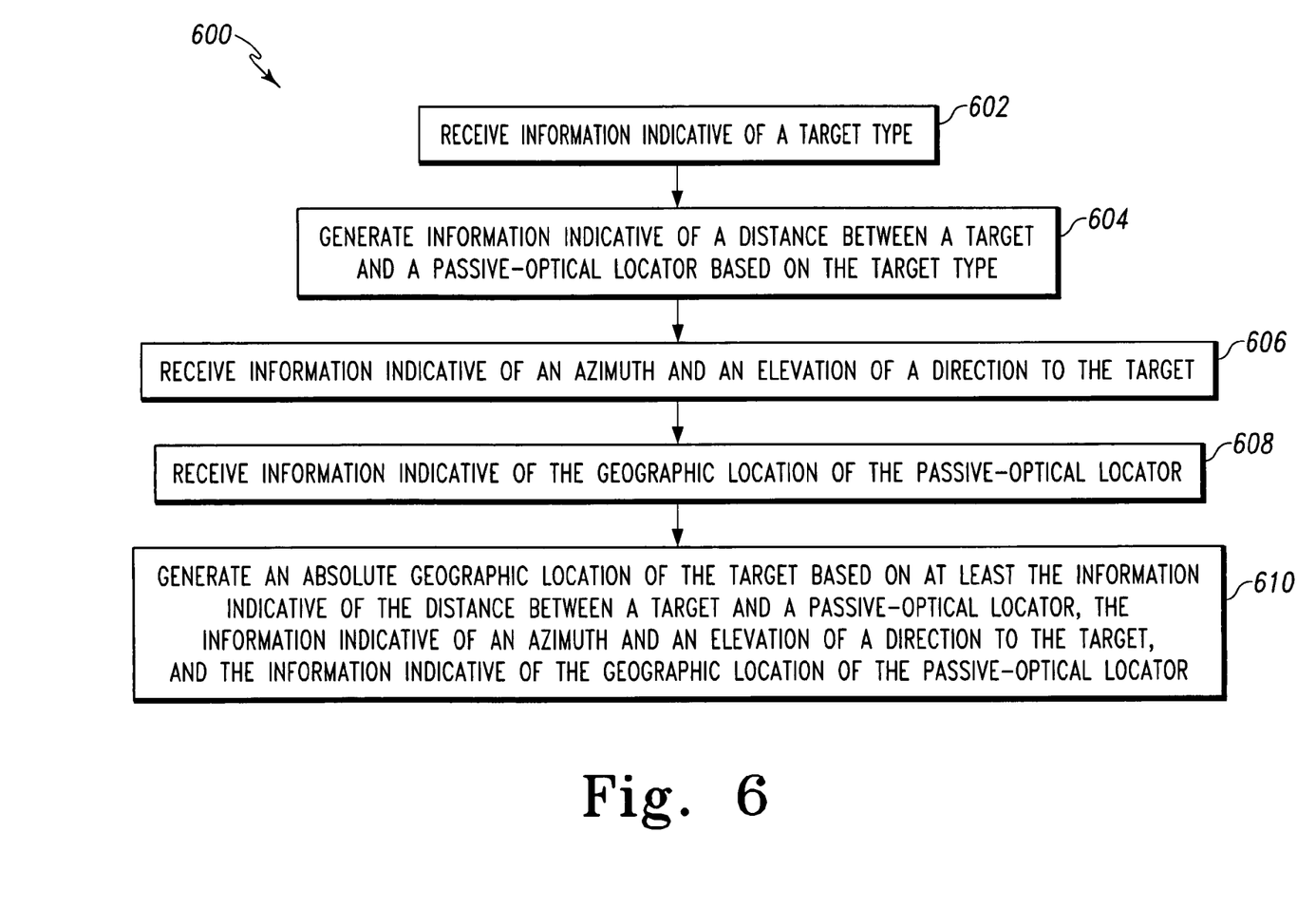
FIG. 6 is a flowchart of one embodiment of a method of generating an absolute geographic location for a target.

FIG. 6 is a flowchart of one embodiment of a method 600 of generating an absolute geographic location for a target. The embodiment of method 600 can be implemented using the passive-optical locator 132 of FIG. 1. In such an embodiment, at least a portion of the processing of method 500 is performed by software executing on the programmable processor 90 of the passive-optical locator 132 and/or the GPS/GYRO device 62 or the passive-optical range-finder 85. Other embodiments are implemented in other ways.

At block 602, information indicative of a target type is received at a programmable processor (for example, by have a user input such information after viewing a selection menu and/or via the execution of pattern-recognition software). At block 604, the programmable processor generates information indicative of a distance between a target and a passive-optical locator based on the target type. For example, the programmable processor 90 determines a distance R to the target 50 based on the focal length of the passive-optical range-finder 85 and a ratio of the height associated with the correlated target type to the image height and a ratio of the width associated with the correlated target type to the image width. In another implementation, the programmable processor 90 determines a distance R to the target 50 based on the focal length of the passive-optical range-finder 85 and a ratio of the height associated with the correlated target type to the image height and a ratio of the depth associated with the correlated target type to the image depth.

At block 606, the programmable processor receives information indicative of an azimuth and an elevation of a direction to the target as described in the '938 application. At block 608, the programmable processor receives information indicative of the geographic location of the passive-optical locator from the GPS 65 shown in the sensors 60 of FIG. 1. At block 610, the programmable processor generates an absolute geographic location of the target based on at least: the information indicative of the distance between the target and the passive-optical locator; the information indicative of an azimuth and an elevation of a direction to the target; and the information indicative of the geographic location of the passive-optical locator. With reference to FIG. 1 and as described in the '938 Application, when the geographic location of the passive-optical locator 132 is known, an absolute geographic location of the target 50 is able to be generated using the distance R between the target 50 and the angle from the optical axis 35 of the passive-optical range-finder 85 when it is focused on the target 50. The programmable processor 90 performs a trigonometric calculation to generate the absolute geographic location of the target 50.

Figure 7:
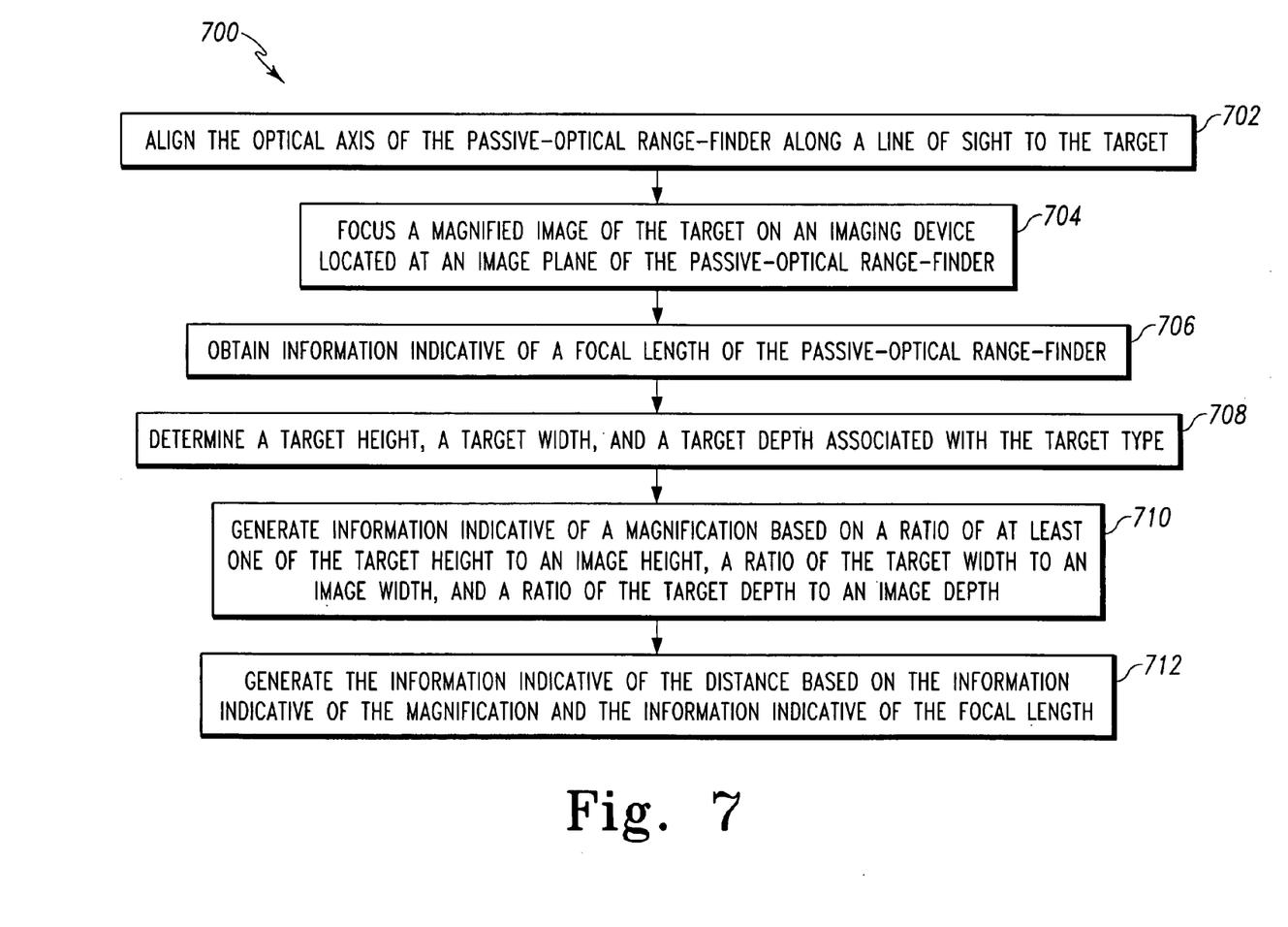
FIG. 7 is a flowchart of one embodiment of a method of generating information indicative of a distance to a target.

FIG. 7 is a flowchart of one embodiment of a method 700 of generating information indicative of a distance to a target. The embodiment of method 700 can be implemented using the passive-optical locator 132 of FIG. 1. In such an embodiment, at least a portion of the processing of method 700 is performed by software 120 executing on the programmable processor 90 of the passive-optical locator 132. Other embodiments are implemented in other ways.

At block 702, the optical axis of the passive-optical range-finder is aligned along a line of sight to the target. With reference to FIG. 1, the operator of the passive-optical locator 132 points the passive-optical range-finder 85 at the target 50 and when the image of the target 50 is visible at the passive-optical range-finder 85, for example on the display 75, the optical axis 35 of the passive-optical range-finder 85 is aligned along a line of sight to the target 50. At block 704, a magnified image of the target is focused on an imaging device located at an image plane of the passive optical range-finder. The operator of the passive-optical locator 132 adjusts the focusing elements of the passive-optical range-finder 85 to focus the magnified image of the target 50 on the imaging device 110. At block 706, information indicative of a focal length of the passive-optical range-finder is obtained. The relative positions of the lenses 86 shift as the focal length of the passive-optical range-finder 85 is adjusted to focus on the distant target 50 and/or to zoom in or out on the target 50. In one implementation of this embodiment, the programmable processor 90 is communicatively coupled to other sensors 61 that sense the relative positions of the lenses 86 and send the information indicative of the relative positions to the programmable processor 90. The programmable processor 90 executes software 120 to generate the focal length information from the relative positions of the lenses 86. At block 708, a target height, a target width, and a target depth associated with the target type are determined. In one implementation of this embodiment, the target height, target width, and target depth are determined from a lookup table. At block 710, information indicative of a magnification is generated. The information indicative of the magnification is generated based on a ratio of at least one of: a ratio of the target height to an image height; a ratio of the target width to an image width; and a ratio of the target depth to an image depth. At block 712, the information indicative of the distance is generated based on the information indicative of the magnification and the information indicative of the focal length. The ratio of the focal length to the distance (which is written as FL/R) is equal to the ratio of the image (i)/object (o), which equals the magnification (M) of the passive-optical range-finder 85. Thus, the distance equals the magnification divided by the focal length (R=M/FL).

Figure 8:
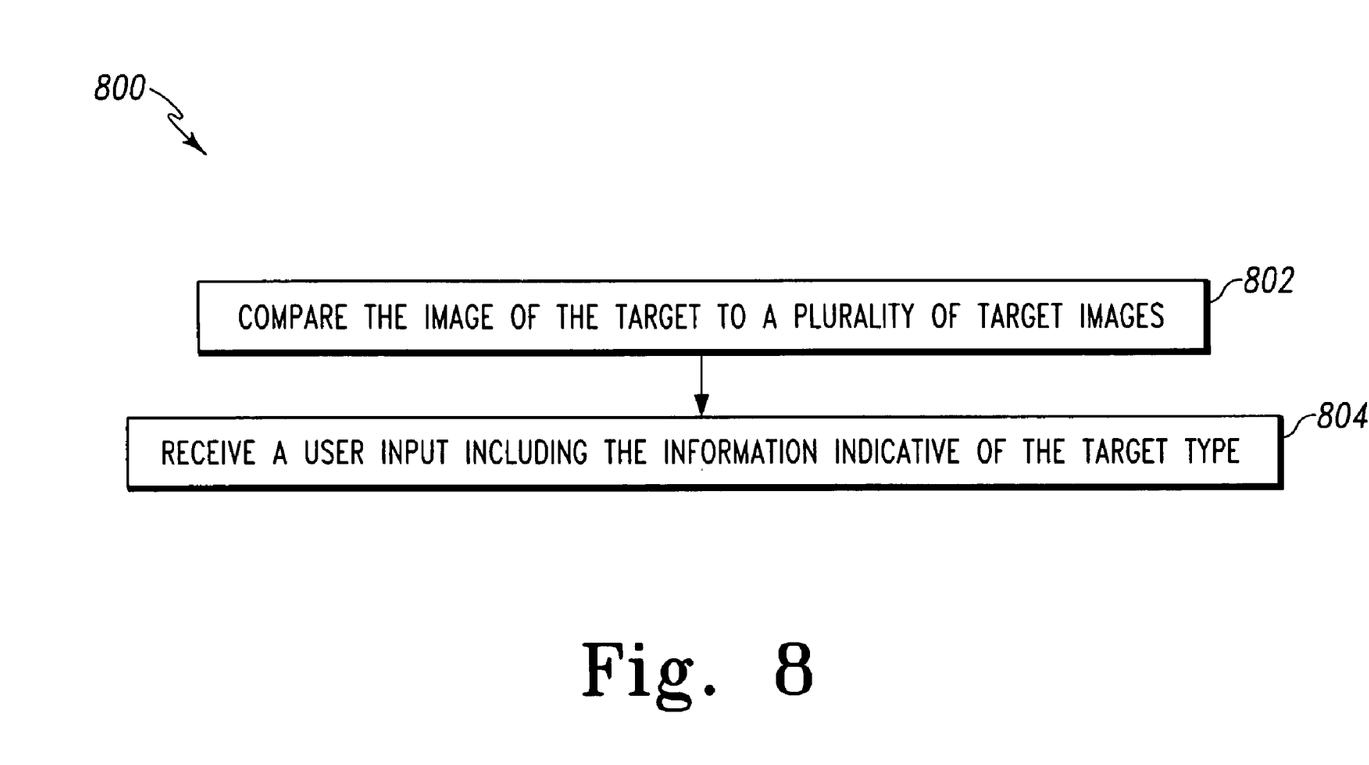
FIG. 8 is a flowchart of one embodiment of a method to receive information indicative of a target type at a passive-optical locator.

FIG. 8 is a flowchart of one embodiment of a method 800 to receive the information indicative of the target type at a passive-optical locator. In one implementation of this embodiment, method 800 is implemented using the passive-optical locator 132 of FIG. 1. Other embodiments are implemented in other ways.

At block 802, a programmable processor compares an image of a target to a plurality of target images. In this case, a memory in a passive-optical locator includes the plurality of target images and the programmable processor in the passive-optical locator compares the images in the memory to a magnified image of a target from an imaging device executing software, such as pattern recognition software. When the image of the target matches one of the plurality of target images, then the programmable processor determines the target type based on a target type linked to the matched target image. In one implementation of this embodiment, pattern matching software executed by the programmable processor 90 generates the target-type information.

At block 804, the programmable processor receives a user input including information indicative of a target type. In one implementation of this embodiment, the information indicative of the target type is input via an operator input interface. For example with reference to FIG. 1, the programmable processor 90 outputs the image signals to the display 75 for viewing of the target image by a user of the passive-optical locator 132. In this case, an operator of the passive-optical locator 132 views the image of the target 50 displayed on the display 75 and inputs target-type information via the operator input interface 111 based on the viewed image. In one implementation of this embodiment, a passive-optical locator is capable of implementing both block 802 and block 804. In another implementation of this embodiment, a passive-optical locator is capable of implementing block 802 or block 804.

The systems, devices, methods, and techniques described here may be implemented in digital electronic circuitry, or with a special-purpose processor or a general-purpose processor such as a computer, firmware, software, or in combinations of them. For example, an electronically processed image can focused by numerically evaluating the pixel distribution or by algorithmically processing the pixel data, i.e. intensity, spectral range, etc. to find a "best-fit" distribution that the processing system offers as range in focus. When the system "recognizes" this image, the optics are in focus and it can therefore offer a range to target.

Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs). As used here, the devices, such as computers, controller processors, ASICS and memories that are implementing programs, software, algorithms or variants and associated items thereof may be used to denote functions such as neural net(s), artificial intelligence, analog and/or (super)state machines.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system comprising:
   an imaging device;
   a passive-optical range-finder to focus, on the imaging device, a magnified image of a target positioned in a focal plane of the passive-optical range-finder; and
   at least one sensor to generate information indicative of an azimuth and an elevation of an optical axis of the passive optical range-finder when the magnified image of the target is focused on the imaging device,
   wherein the system receives the information indicative of the azimuth and the elevation and information indicative of a target type and generates information indicative of an absolute geographic location for the target based on the target type, the information indicative of the azimuth and the elevation, and information output by the imaging device in connection with imaging the magnified image of the target is focused on the imaging device;
   wherein the system is configured to generate the information indicative of the absolute geographic location for the target based on a single imaging of the target.

2. The system of claim 1, wherein the information indicative of the absolute geographic location for the target is generated, at least in part, based on at least one of: information indicative of a magnification of the magnified image, information indicative of a focal length of the passive-optical range-finder, and information indicative of a geographic location associated with the passive-optical locator.

3. The system of claim 1, further comprising a memory in which a lookup table is stored, wherein the lookup table comprises information about a plurality of target types, wherein the information indicative of the absolute geographic location for the target is generated, at least in part, using at some of the information included in the lookup table.

4. The system of claim 3, wherein the lookup table comprises information indicative of at least one of a height, a width, and a depth of a respective one of the plurality of target types.

5. The system of claim 4, wherein the imaging device comprises an array of imaging elements, wherein the focused magnified image of the target is incident on a set of the imaging elements in order to generate at least a portion of the information output by the imaging device, wherein the system determines at least one of an image height, an image width, and an image depth of the focused magnified image based on the information output by the imaging device, wherein the set of the imaging elements includes one of all of the imaging elements within a field of view of the passive-optical locator and less than all of the imaging elements within the field of view of the passive- optical locator.

6. The system of claim 5, further comprising:
   a display communicatively coupled to imaging device to display the magnified image of the target; and
   a user input interface to receive the information indicative of the target type.
   wherein the system correlates the information indicative of the target type to one of the plurality of target types in the lookup table and uses at least one of the height, the width, and the depth associated with the correlated target type, wherein the system determines a distance to the target based on the focal length of the passive-optical range-finder and at least one of a ratio of the height associated with the correlated target type to the image height, a ratio of the width associated with the correlated target type to the image width, and a ratio of the depth associated with the correlated target type to the image depth, wherein the information indicative of the absolute geographic location for the target is generated, at least in part, based on the distance.

7. The system of claim 5, further comprising pattern-recognition software to determine the target type for the target.

8. The system of claim 5:
   wherein the array of imaging elements of known size and spacing along two dimensions;
   wherein the set of the imaging elements on which the focused magnified image of the target is incident defines a target outline; and
   wherein the focused magnified image of the target is incident on:
     all the imaging elements in at least one row of the target outline; and
     all the imaging elements in at least one column of the target outline;
   wherein the at least one row provides information indicative of one of the image width and the image depth and the at least one column provides information indicative of the image height.

9. A method comprising:
   focusing a passive-optical range-finder to focus, on an imaging device, a magnified image of a target positioned in a focal plane of the passive-optical range-finder;
   receiving information indicative of a target type;
   receiving information indicative of an azimuth and an elevation of an optical axis of the passive optical range-finder; and
   generating information indicative of an absolute geographic location for the target based on the target type, the information indicative of the azimuth and the elevation, and information output by the imaging device in connection with imaging the magnified image of the target is focused on the imaging device;
   wherein the generating of the information indicative of the absolute geographic location for the target is based on a single imaging of the target.

10. The method of claim 9, wherein the information indicative of the absolute geographic location for the target is generated, at least in part, based on at least one of: information indicative of a magnification of the magnified image, information indicative of a focal length of the passive-optical range-finder, and information indicative of a geographic location associated with the passive-optical locator.

11. The method of claim 9, further comprising storing a lookup table in a memory, wherein the lookup table comprises information about a plurality of target types, wherein the information indicative of the absolute geographic location for the target is generated, at least in part, using at least some of the information included in the lookup table.

12. The method of claim 11, wherein the lookup table comprises information indicative of at least one of a height, a width, and a depth of a respective one of the plurality of target types.

13. The method of claim 12, wherein the imaging device comprises an array of imaging elements, wherein the focused magnified image of the target is incident on a set of the imaging elements in order to generate at least a portion of the information output by the imaging device, wherein the method further comprises determining at least one of an image height, an image width, and an image depth of the focused magnified image based on the information output by the imaging device, wherein the set of the imaging elements includes one of all of the imaging elements within a field of view of the passive-optical locator and less than all of the imaging elements within the field of view of the passive-optical locator.

14. The method of claim 13, further comprising:
correlating the information indicative of the target type to one of the plurality of target types in the lookup table; and
determining a distance to the target based on the focal length of the passive-optical range-finder and at least one of a ratio of the height associated with the correlated target type to the image height, a ratio of the width associated with the correlated target type to the image width, and a ratio of the depth associated with the correlated target type to the image depth, wherein the information indicative of the absolute geographic location for the target is generated, at least in part, based on the distance.

15. A method comprising:
receiving information indicative of a target type;
generating information indicative of a distance between a target and a passive-optical locator based on the target type and information output by an imagining device in connection with imagining a magnified image of the target focused on the imaging device;
receiving information indicative of an azimuth and an elevation of a direction to the target;
receiving information indicative of the geographic location of the passive-optical locator; and
generating an absolute geographic location of the target based on the information indicative of the distance between a target and a passive-optical locator, the information indicative of an azimuth and an elevation of a direction to the target, and the information indicative of the geographic location of the passive-optical locator;
wherein the generating of the information indicative of the absolute geographic location of the target is based on a single imaging of the target.

16. The method of claim 15, wherein generating the information indicative of the distance between the target and the passive-optical locator comprises:
aligning the optical axis of the passive-optical range-finder along a line of sight to the target;
focusing the magnified image of the target on the imaging device located at an image plane of the passive optical range-finder;
obtaining information indicative of a focal length of the passive-optical range-finder;
determining a target height, a target width, and a target depth associated with the target type;
generating information indicative of a magnification based on at least one of a ratio of the target height to an image height, a ratio of the target width to an image width, and a ratio of the target depth to an image depth; and
generating the information indicative of the distance based on the information indicative of the magnification and the information indicative of the focal length.

17. The method of claim 15, wherein receiving the information indicative of the target type comprises comparing the image of the target to a plurality of target images.

18. The method of claim 15, wherein receiving the information indicative of the target type comprise receiving a user input including the information indicative of the target type.

* * * * *